JOHN M. HUNT
INVENTOR

BY Darby & Darby
ATTORNEY

JOHN M. HUNT
INVENTOR

BY Darby + Darby

ATTORNEY

United States Patent Office 2,975,532
Patented Mar. 21, 1961

2,975,532
AIRCRAFT FLIGHT SIMULATING TRAINING APPARATUS

John M. Hunt, Binghamton, N.Y., assignor to General Precision Inc., a corporation of Delaware Filed Jan. 4, 1957, Ser. No. 632,482

11 Claims. (Cl. 35—12)

The present invention relates to the generation of the Euler angles in flight simulators and more particularly to the improved computation of bank angle in its correlation with azimuth angle at such times when the pitch angle of the simulated aircraft is in the area of ninety degrees in magnitude.

Modern high performance interceptor aircraft are equipped with jet engines sufficiently powerful to permit sustained near vertical flight. Moreover, present day military tactics require the execution of precision maneuvers at or near vertical flight, while unconventional aircraft such as vertical take-off interceptors also maneuver at or near vertical flight. In keeping with the need for instrument presentation at these attitudes, "all attitude" gyros are mounted in these aircraft in contrast with the older type attitude gyro which would "tumble" after the aircraft had reached a certain maximum pitch angle less than ninety degrees or vertical flight.

As is well known, modern flight simulators and grounded aircraft trainers solve the equations of motion of an aircraft by means of analog computer equipment to provide instrument and other output indications simulating those same indications which would appear on the instruments and indicators of a real aircraft under the same flight conditions. Thus since the real instrument indications dependent on the real "all-attitude" gyro (such as the artificial horizon indication, for example), are accurate in the area of vertical flight in a real aircraft, the flight equations and analog computer equipment utilized to simulate the Euler angles of such a real aircraft should, when possible, be of commensurate reliability and accuracy in the same area of operation. Moreover, the flight simulators of aircraft which operate in the area of vertical flight may include advanced radar displays and visual training attachments which are dependent on the instantaneous Euler angles generated by analog computation azimuth angle $\psi$, bank angle ($\phi$) and pitch angle $\theta$ in a manner such that specific failings in accurate simulation of vertical flight are emphasized and are misleading to the operator in training for the operation of the actual aircraft. As will more fully be set forth below, certain flight equations which have been used by the prior art in the generation of the rate of change of azimuth angle $\dot{\psi}$ and the rate of change of bank angle $\dot{\phi}$, contain certain trigonometric terms, which by their mathematical nature, appear to be large and approach infinity in magnitude as the simulated aircraft maneuvers toward vertical flight.

For example, the aircraft rate of change of bank angle $\dot{\phi}$ may be rigorously expressed as follows:

$$\dot{\phi} = p + \dot{\psi} \sin \theta \qquad (1)$$

Since the $p$ term expresses the aircraft rate of roll about the aircraft $x$ axis and the $\dot{\psi} \sin \theta$ term expresses the effect on the rate of change of bank angle of the rotation of the aircraft axes system itself with respect to the earth, it will be seen that the sum of the terms expresses rate of change of aircraft bank angle, which is specified with respect to the earth. The term $\dot{\psi}$, the aircraft rate of change of azimuth angle with respect to the earth, may be rigorously specified as follows:

$$\dot{\psi} = \frac{1}{\cos \theta}(q \sin \phi + r \cos \phi) \qquad (2)$$

wherein $q$ and $r$ are the rotational velocities about the aircraft lateral ($y$) and longitudinal ($x$) axes, respectively.

Combining the two above equations:

$$\dot{\psi} = p + \tan \theta \ (q \sin \theta + r \cos \theta) \qquad (3)$$

It may be observed from Equations 2 and 3, and also from purely physical considerations that ($\dot{\psi}$), aircraft rate of change of azimuth, and ($\dot{\phi}$) aircraft rate of change of bank angle approach infinity as aircraft pitch angle increases. Moreover, according to their definitions, the aircraft azimuth angle and bank angle become meaningless when the aircraft is flying straigh up or straight down. As ($\theta$) aircraft pitch angle approaches ninety degrees, analog computer equipment arranged to solve the above equations will behave very erratically, in that amplifiers and integrators will saturate in their attempts to provide infinite output voltages, and servomechanisms may be driven to one or other of their mechanical limits. Thus, although an actual aircraft may pitch upwardly toward and past the zenith without experiencing unrealistic visual presentations in instrument indications, simulators constructed to operate according to the equations described above have provided extremely unrealistic simulation of aircraft azimuth and bank angle at large values of simulated pitch angle. In addition to all-attitude gyros and other improved indicating means many advanced aircraft embody radar display systems which operate during flight at large pitch angles as well as small pitch angles. To simulate properly the operation of such roll angle indicating equipment, it is necessary to derive a simulator computer quantity which provides a realistic imitation of actual aircraft roll at large values of pitch angle. Being supplied with input magnitudes which attempt to approach infinity as simulated pitch angle approaches ninety degrees, a conventional grounded trainer bank angle servo is entirely inadequate as a means to provide simulated data to a simulated "all attitude" gyro or a simulated radar display. As already suggested, an increasing number of flight trainers are being equipped with visual display attachments to provide simulated scenes of ground terrain or other aircraft, and proper correlation between simulated aircraft roll and heading data is necessary in order to operate such visual display apparatus in a realistic manner.

To give physical significance to Equations 2 and 3 it may be helpful to consider an aircraft which has a given azimuth angle $\psi$ and zero bank angle $\phi$ while the pilot maintains a constant backward displacement of the stick. If the bank angle $\phi$ and azimuth angle $\psi$ of the aircraft are maintained zero and constant respectively, both are subject to an instaneous 180 degree change in magnitude as the aircraft passes through a pitch angle of ninety degrees. These instantaneous changes in magnitude require the infinite rates of change of azimuth angle $\dot{\psi}$ and bank angle $\dot{\phi}$ resulting from considering the mathematical significance of the $$\frac{1}{\cos \theta}$$

and tan $\theta$ terms as set forth in Equations 2 and 3 respectively when the pitch angle is ninety degrees.

Likewise, when neither bank angle $\phi$ nor azimuth angle $\psi$ are maintained constant during the time when the stick is maintained at a constant backward displacement, the pitch angle $\theta$ will increase toward ninety degrees. As represented by Equations 2 and 3 above and distinguished from the previous example when the azimuth angle $\psi$ was not allowed to change and the bank angle was held at zero, the instantaneous 180° changes in magnitude of bank angle $\phi$ and azimuth angle $\psi$ (requiring infinite rates of change in magnitudes) do not occur as the pitch angle goes through ninety degrees. In fact the pitch angle does not reach ninety degrees because the azimuth angle changes in magnitude by 180° before this value of pitch angle is reached. Also bank angle $\phi$ changes in magnitude by 180 degrees before a pitch angle of ninety degrees is reached. During this maneuver the relationship between the bank angle $\phi$, the rate of change of azimuth angle $\dot\psi$ and the rate of bank angle $\dot\phi$ of the aircraft is expressed by Equations 2 and 3. If the backward displacement of the stick is maintained beyond the point in time which the azimuth angle $\psi$ is reversed the pitch angle will decrease toward zero.

Inspection of Equtaions 2 and 3 above indicates that the rate of change (hence also the magnitudes) of azimuth angle $\dot\psi$ and bank angle $\dot\phi$ are implicitly dependent on one another. Thus during operation of an aircraft at any attitude, azimuth angle $\psi$ and bank angle $\phi$ should bear a definite relationship to one another characterized by Equations 2 and 3 and to Equation 1 on which Equation 3 is based. One example of this relationship is set forth in Equation 1, which indicates that it is possible to have a rate of change of bank angle $\dot\phi$ when the roll rate $p$ is zero. The maintenance of this relationship would provide no problem in flight simulators if Equations 2 and 3 could be solved properly by analog computation technique for all ranges of pitch angle ($\theta$). However, as pointed out above, this has not been possible because the terms $$\frac{1}{\cos\theta}$$

and $\tan\theta$ of Equations 2 and 3 may make the rate of change of azimuth angle $\dot\psi$ and bank angle $\dot\phi$ approach infinite magnitude at very large angles of pitch angle $\theta$, and analog computer components such as electronic or electromechanical integrators, being saturable in nature, are not able to integrate extreme rate of change input signals.

Because Equations 2 and 3 for $\psi$ and $\phi$ are themselves rigorous these troublesome mathematical relationships cannot be avoided easily in analog computation. However, according to the present invention these equations may be rearranged such that within the limits of analog computation these problems may be minimized. More particularly, the present invention provides a means such that, even though the correct values for the rate of change of azimuth angle $\dot\psi$ and the rate of change of bank angle $\dot\phi$ cannot be determined during periods when the pitch angle $\theta$ increases to or near ninety degrees, these incorrect values for the azimuth angle and bank angle and rate of change of each do satisfy the mathematical relationships set forth by the rigorous Equations 1, 2 and 3. In this way simulators for aircraft having all-attitude gyros may have proper correlation between the heading and bank angle indications even at pitch angles near vertical flight. Moreover, if the flight simulator includes a visual presentation attachment and/or a simulated radar display each responsive to the orientation angles, bank angle $\phi$, pitch angle $\theta$ and the azimuth angle $\psi$, the proper correlation between bank angle $\phi$ and azimuth angle $\psi$ is even more important. For example, if Equation 1 is satisfied, even though the absolute values of the rate of change of bank angle $\dot\phi$ and the rate of change of azimuth angle $\dot\psi$ are incorrect, the simulator realistically may have a simulated rate of change of bank angle $\dot\phi$, as does a real aircraft, even though the roll rate $p$ is zero, thus making a simulated visual presentation more realistic. The means by which the present invention accomplishes this will be more apparent from a consideration of the computer circuitry and mathematical background set forth below.

It is therefore a primary object of the present invention to provide a flight simulator having improved correlation between simulated bank angle and simulated azimuth (heading) angle at large values of simulated pitch angle of a simulated aircraft.

It is another object of the present invention to provide an improved means for simulating an all-attitude gyro in a flight simulator.

It is a further object of the present invention to provide improved means in a flight simulator for rigorously correlating the rate of change of bank angle and the rate of change of azimuth angle in a flight simulator at simulated pitch angles at or near ninety degrees.

It is still another object of the present invention to provide an improved means for generating instantaneous Euler angle analog quantities of a simulated aircraft at or near simulated vertical flight to provide input quantities to a visual presentation attachment.

It is another object of the present invention to provide an improved means for generating the Euler angles of a simulated aircraft at or near vertical flight to provide inputs to a simulated radar display.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figure 1:
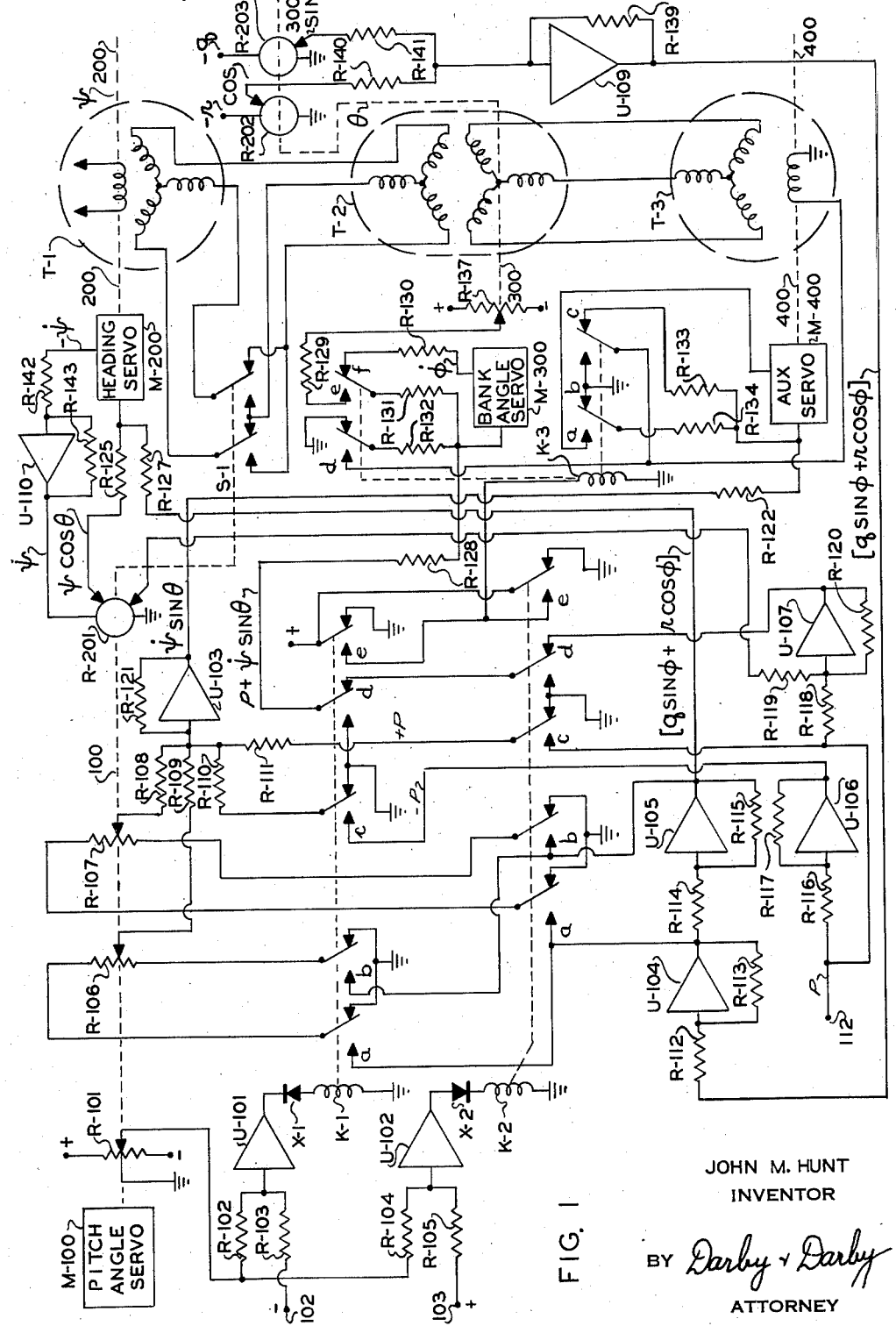
Fig. 1 is an electrical schmatic diagram of an illustrative embodiment of the present invention.

Show in Fig. 1 in block form are a simulated pitch angle servo M–100, a simulated azimuth or heading servo M–200, a simulated bank angle servo M–300, and an auxiliary servo M–400. Each of these servos, with the exception of the auxiliary servo, commonly has a counterpart in simulators constructed in accordance with the teachings of the prior art. The heading servo output shaft 200 is shown merely as positioning the rotor of a synchro transmitter T–1, but it is to be understood that shaft 200 also is connected to numerous other simulator elements which require simulated azimuth as an input quantity such as a radar display and visual presentation attachment mentioned above. Similarly, while pitch angle servo M–100 and bank angle servo M–300 are shown as connected to operate only a few computer elements, it is to be understood that the output shafts of these servos are connected to operate their usual devices in addition to those shown.

Auxiliary servo M–400, which has no counterpart in prior art apparatus, operates in a manner to be set forth more fully below, to provide a mechanical output position quantity commensurate with $(\psi-\phi)$, the difference between azimuth angle and bank angle, during simulated pitch angle conditions greater than a predetermined angle, such as plus 30 degrees, and to provide a quantity commensurate with $(\psi+\phi)$, the sum of simulated azimuth and bank angles, during simulated pitch angles, less than a predetermined angle, such as minus 30 degrees. During simulated pitch angle conditions between the two predetermined angles, servo M–400 does not operate to influence output indications, but instead it merely follows the conventional portion of the simulator computer so as to be prepared to begin providing one of the above output quantities if simulated pitch angle exceeds one of the predetermined angle limits. When simulated pitch angle exceeds one of the limits, auxiliary servo M-400 begins operating as a velocity or integrating servo. As will be more fully explained below, the potentials which are necessary to operate servo M-400 do not approach or attempt to approach extreme values as simulated pitch angle nears positive or negative ninety degrees, so that auxiliary servo M-400 has no occasion to behave wildly when large simulated pitch angles occur.

Assume initially that the simulated aircraft is flying at a moderate pitch angle, i.e., a pitch angle between the selected limits of operation of the auxiliary servo, which will be assumed to be plus and minus 30 degrees for purposes of explanation. Pitch angle servo M-100, which may comprise any one of many conventional trainer pitch angle servos, receives input potentials commensurate with either rate of change of pitch angle or pitch angle itself (depending upon whether servo M-100 is selected to be a position servo or an integrating servo), and positions a conventional analog computer resolver R-201, a pair of function-generator potentiometers R-106 and R-107, and a relay-switching potentiometer R-101. The shaft of pitch angle servo M-100 also operates switch S-1 by means of a cam (not shown) to determine operation of auxiliary servo M-400 in a manner to be described below. The input quantity applied to operate pitch angle servo M-100 as an integrator may be conventional, and may comprise, for example, a quantity commensurate with the following expression:

$$\theta = q \cos \phi - r \sin \phi$$

where
$q$ represents the rate of pitch of the aircraft about its Y axis with reference to the earth, and
$r$ represents the rate of turn of the aircraft about its Z axis.

Various other schemes for operating pitch angle servos are known in the art, and may be substituted. Pitch angle servo M-100 may position a number of further potentiometers, switches and other apparatus, none of which is shown, such as the pitch bar, for example of a simulator attitude-indicating instrument.

Continuing the assumption of simulated flight within positive or negative pitch angle of less than 30 degrees, the operation and interrelation of servos M-200, M-300 and auxiliary servo M-400 will be considered. Heading servo M-200 receives an input potential via scaling resistor R-127 commensurate with the quantity $$[q \sin \phi + r \cos \phi]$$

The tachometer generator (not shown) of servo M-200 provides a potential commensurate with $\psi$, rate of change of simulated azimuth angle, which potential is applied through a polarity-inverting buffer amplifier to excite resolver R-201, which is positioned, as mentioned above, by pitch angle servo M-100, thereby deriving potentials commensurate with $\psi \cos \theta$ and $\psi \sin \theta$. The $\psi \cos \theta$ potential is applied via scaling resistor R-125 to the input circuit of heading servo M-200. Since the servo will rotate in such a manner as to balance the resultant of its input potentials to zero, it will be seen that azimuth servo M-200 solves Equation 2 to provide an output shaft position commensurate with $\psi$, simulated azimuth angle. Output shaft 200 of azimuth servo M-200 is indicated as positioning the rotor of a conventional synchro transmitter T-1.

During simulated flight at low values of pitch angle (i.e., within 30 degrees), bank angle servo M-300 operates as a velocity or integrating servo and receives input potentials via scaling resistors R-128 and R-131 commensurate with the quantities $[p+\psi \sin \theta]$ and $-\phi$ respectively. The $-\phi$ potential is derived by a tachometer generator (not shown) driven by bank angle servo M-300. The bank angle servo may be seen to solve Equation 1, providing an output shaft position commensurate with simulated bank angle, $\phi$. The output shaft 300 of bank angle servo M-300 is shown as mechanically operating the arm of a position follow-up potentiometer R-137, one set of coils of differential synchro T-2, and two conventional resolvers R-202 and R-203.

The rotor of synchro transmitter T-1 is connected to an alternating current reference supply (not shown) and the stator coils of synchro T-1 are connected to excite the primary windings of differential synchro T-2. Inasmuch as the rotor of T-1 and the secondary coils of T-2 are positioned by the azimuth and bank angle servos, respectively, it will be seen that the relative potentials between the secondary conductors of differential synchro T-2 will vary in accordance with either the sum or the difference of the simulated azimuth and bank angles, or as mathematically expressed $(\psi+\phi)$ or $(\psi-\phi)$, depending upon the polarity of the connections between the synchros. Switch S-1 is operated by pitch angle servo M-100 so as to subtract the $\psi$ and $\phi$ quantities when simulated pitch angle is greater than an arbitrary positive amount, such as 10 degrees, and to add the $\psi$ and $\phi$ quantities when simulated pitch angle is less than (more downward) than an arbitrary amount, such as 10 degrees.

The potentials from synchro T-2 are applied to excite the stator of synchro T-3, thereby providing a resultant flux in synchro T-3 commensurate with the sum or difference quantity. The potential induced in the rotor of synchro T-3 is applied via contact $c$ of relay K-3 and scaling resistor R-133 to the input circuit of auxiliary servo M-400. Servo M-400 operates by driving the rotor coil toward such a position that minimum voltage will be applied to servo M-400, thereby maintaining auxiliary servo M-400 in a position commensurate with the quantity $(\psi+\phi)$ or the quantity $(\psi-\phi)$. Thus whenever simulated pitch angle is more positive than 10 degrees but less positive than 30 degrees, auxiliary servo M-400 will provide a shaft output position commensurate with the quantity $(\psi-\phi)$, and whenever simulated pitch angle is more negative than 10 degrees but less negative than 30 degrees, auxiliary servo M-400 will provide an output shaft position commensurate with the quantity $(\psi+\phi)$. During such operation, the position of auxiliary servo M-400 is entirely dependent upon the values of $\psi$ and $\phi$ applied to the synchros T-1 and T-2 by servos M-200 and M-300, and it will be seen that the position of auxiliary servo M-400 itself does not affect the computations made in conventional manner by azimuth servo M-200 and bank angle servo M-300. Servo M-400 does not drive any indicators, nor is its position significant while simulated pitch angle is between positive and negative thirty degrees. The connections shown are provided merely to make servo M-400 follow either the sum or difference quantity during small (less than 30 degrees) pitch angle operation so that as soon as simulated pitch angle exceeds positive or negative 30 degrees servo M-400 will be in position to compute. If servo M-400 were entirely disconnected during small simulated pitch angle conditions, it might result in integration from an erroneous initial position when simulated pitch angle did exceed 30 degrees. Cam-operated switch S-1 is preferably open during a certain range of low values of pitch angle (between plus and minus 10 degrees) so that auxiliary servo M-400 is totally inoperative. Provision of such a dead-band will prevent unnecessary operation of servo M-400 in an alternation between the $(\psi+\phi)$ and $(\psi-\phi)$ quantities during small changes in pitch angle.

Assume now that simulated pitch angle increases upwardly from level flight. As simulated pitch angle becomes 10 degrees switch S-1 will close, connecting auxiliary servo M-400 to operate as described below to provide a shaft position commensurate with the value of the quantity $(\psi-\phi)$. Now, as simulated pitch angle reaches and exceeds positive thirty degrees, a number of transitions occur. Relay-switching potentiometer R-101 mentioned above, has its winding excited by constant voltages from the computer power supply, and its wiper arm is positioned by pitch angle servo M-100, thereby providing a potential on the arm of potentiometer R-101 commensurate with simulated pitch angle $\theta$. This potential is applied via scaling resistor R-102 to be compared with a referefnce potential applied from terminal 102 via scaling resistor R-102. Whenever simulated pitch angle is less than 30 degrees, the negative potential from terminal 102 overrides the $\theta$ potential from potentiometer R-101, making the output potential from amplifier U-101 positive. The output potential from amplifier U-101 is applied via rectifier X-1 to the coil of relay K-1. Rectifier K-1 is poled so that a positive output potential from amplifier U-101 does not operate relay K-1, but as soon as the $\theta$ potential from potentiometer R-101 increases due to simulated pitch angle reaching and beginning to exceed 30 degrees, the resultant output potential from amplifier U-101 will become reversed in polarity, thereby operating relay K-1. A similar arrangement is provided to operate relay K-2 whenever simulated pitch angle becomes more negative than 30 degrees. While the sensing of the magnitude and sign of $\theta$ is accomplished by the means disclosed herein, it will be readily apparent to those skilled in the art that the same functions might well be accomplished by means of cam actuated switch contacts associated with the pitch angle servo shaft.

As relay K-1 transfers, a supply voltage is routed via contact $e$ of relay K-1 to energize relay K-3. It may be noted that operation of relay K-2 during times when the pitch angle is more negative than minus 30 degrees also will cause relay K-3 to transfer, by means of contact $e$ of relay K-2. Transfer of relay K-3, during simulated pitch angles greater than 30 degrees either positive or negative serves to connect bank angle servo M-300 as a position servo and to connect auxiliary servo M-400 as an integrating or velocity servo, as now will be explained.

It will be seen that transfer of relay K-3 will disconnect the $-\phi$ tachometer generator potential theretofore applied to servo M-300 via contact $f$ and scaling resistor R-131, and will instead apply a $-\phi$ position feedback potential from potentiometer R-137 via contact $e$ of relay K-3. Similarly, operation of relay K-3 will open its contact $c$, disconnecting the rebalancing potential of the rotor coil of synchro T-3 from servo M-400, and simultaneous closure of contact $a$ of relay K-3 will apply a rate feedback potential from a tachometer generator (not shown) driven by servo M-400 via scaling resistor R-134. Thus as simulated pitch angle exceeds +30 degrees, bank angle servo M-300 will begin to operate as a position servo, and auxiliary servo M-400 will begin to operate as an integrator. As well as altering the feedback connections of these two servos, exceeding the simulated critical pitch angle will cause the input quantities to these servos to change in nature. The $[p+\dot{\psi} \sin \theta]$ potential theretofore supplied to servo M-300 via resistor R-128 is disconnected by the opening of contact $d$ of relay K-1, and in its place, the voltage of the output coil of synchro T-3 is connected. The rotor coil voltage theretofore supplied to auxiliary servo M-400 via resistor R-133 is disconnected by opening of contact $c$ of relay K-3, and in its stead, an output potential from amplifier U-103 is applied to servo M-400 via scaling resistor R-122. Prior to attainment of the +30 degree pitch angle, the output potential from amplifier U-103 has been zero, resulting from the fact that potentiometers R-106 and R-107 have their input terminals grounded during the range of $\theta$ between ±30°.

During all simulated flight conditions, and regardless of pitch angle, positive and negative potentials commensurate with the quantity $[q \sin \phi + r \cos \phi]$ are made available at the output terminals of amplifiers U-104 and U-105 by circuitry to be explained below. As simulated pitch angle exceeds +30 degrees and relay K-1 operates, these potentials are applied to excite function potentiometer R-106, a non-linear potentiometer having its wiper arm positioned by the simulator pitch angle servo. Potentiometer R-106 is provided with a voltage versus shaft position characteristic in accordance with the function $$\frac{1-\sin \theta}{\cos \theta}$$

for a purpose to be described below. The potential on the arm of potentiometer R-106 appears as soon as the potentiometer winding is excited, and this potential is applied to summing amplifier U-103 via scaling resistor R-109. Similarly, potentiometer R-107 receives excitation in accordance with the quantity $[q \sin \phi$ and $r \cos \phi]$ if simulated pitch angle goes below negative 30 degrees due to operation of contacts $a$ and $b$ of relay K-2. Potentiometer R-107, however, has a voltage versus shaft rotation characteristic in accordance with the function $$\frac{1+\sin \theta}{\cos \theta}$$

A potential commensurate with simulated rate of roll $p$ derived elsewhere in the simulator is applied at terminal 112. This potential may be seen to be applied to amplifier U-103 via polarity inversion amplifier U-106, contact $c$ of relay K-1 and resistor R-110 if pitch angle exceeds +30° so that relay K-1 is operated; or, the rate of roll potential may be applied directly (without polarity inversion) via contact $c$ of relay K-2 and resistor R-111 if simulated pitch angle goes negative beyond $-30$ degrees, so that relay K-2 is operated. Thus, if simulated pitch angle is instantaneously between the limits of +30 degrees and $-30$ degrees, the output potential of amplifier U-103 is zero; if simulated pitch angle exceeds +30 degrees the output potential of amplifier U-103 is commensurate with:

$$[q \sin \phi + r \cos \phi]\left[\frac{1-\sin \theta}{\cos \theta}\right]-p$$

and if simulated pitch angle exceeds $-30$ degrees in a negative direction, the output potential of amplifier U-103 is commensurate with:

$$[q \sin \phi + r \cos \phi]\left[\frac{1+\sin \theta}{\cos \theta}\right]+p$$

A potential commensurate with one of the two quantities given above is integrated with respect to time by the auxiliary servo whenever simulated pitch angle exceeds one of the 30 degree limits. The validity of the above expressions may be determined by differentiating the quantities $(\psi-\phi)$ and $(\psi+\phi)$ with respect to time, as follows:

$$\frac{d(\psi-\phi)}{dt}=\dot{\psi}-\dot{\phi} \qquad (4)$$

Substituting from Equation 1:

$$\dot{\psi}-\dot{\phi}=\dot{\psi}[1-\sin \theta]-p$$

Substituting from Equation 2:

$$\dot{\psi}-\dot{\phi}=\frac{[1-\sin \theta]}{\cos \theta}[q \sin \phi + r \cos \phi]-p \qquad (5)$$

Similarly, differentiation of $(\psi+\phi)$ with respect to time provides the alternate quantity present at the output circuit of amplifier U-103. Hence it will be seen that if auxiliary servo M-400 integrates the output potential of amplifier U-103 with respect to time, servo M-400 will provide a shaft output position commensurate with $(\psi-\phi)$ when simulated pitch angle exceeds +30 degrees, and will provide a shaft output position commensurate with $(\psi+\phi)$ when simulated pitch angle goes negative beyond 30 degrees.

The operation of heading servo M-200 remains unchanged as simulated pitch angle varies, and servo M-200 continues to position the rotor of synchro transmitter T-1 in accordance with the azimuth angle $\psi$. Since the auxiliary servo actively positions the rotor of synchro T-3 in accordance with the quantity $(\psi+\phi)$ as pitch angle increases above +30 degrees, it may be seen that an output voltage will be induced in the rotor coil of synchro T-3 unless differential synchro T-2 is positioned in accordance with the angle $\phi$. Since the output voltage of the rotor coil of synchro T-3 is applied via contact $d$ of relay K-3 and via scaling resistor R-132 to the input circuit of the bank angle servo, it will be seen that servo M-300 is constrained to maintain an output shaft position commensurate with the angle $\phi$. Since the bank angle servo continues to provide an output shaft position commensurate with simulated bank angle $\phi$ after simulated pitch angle has increased beyond +30 degrees, the operation of instruments and other computer elements affected by simulated bank angle continues as before. From the above description of operation, the converse operations which occur during simulated downward pitch angles greater than 30 degrees will be obvious.

Figure 2:
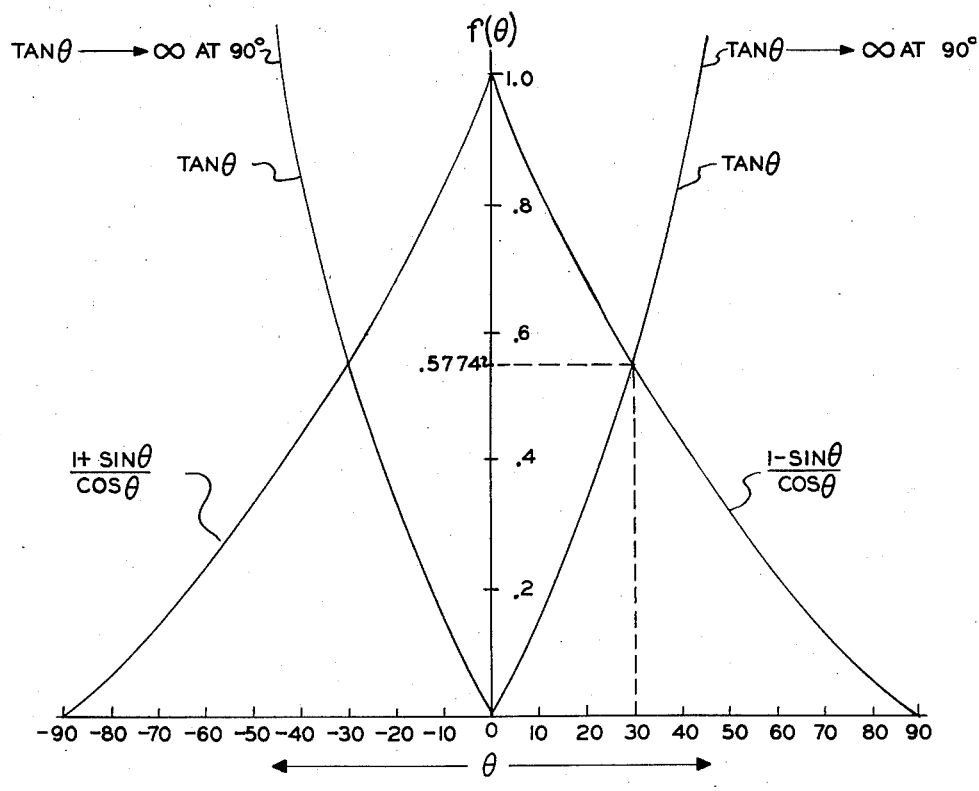
Fig. 2 is a graph of functions of the pitch angle which are useful in understanding the present invention.

It will be seen from the above, that during low pitch angle simulation the auxiliary servo is positioned in accordance with the output of the bank angle servo, but that during simulation of great pitch angles the converse is true, i.e., the bank angle servo position is determined by the auxiliary servo position. If the bank angle servo is to provide realistic simulation of bank angle during great pitch angle conditions, it follows that the heading and the auxiliary servo input quantities which determine bank angle servo position under such conditions be free from wild operation at simulated pitch angles greater than +30 degrees or less than —30 degrees. In prior art apparatus the azimuth servo and the bank angle servo received input potentials which tended to approach infinity because of the nature of the expressions mechanized to be solved for azimuth and bank angle. Shown in Fig. 2 are plots of the functions $$\frac{1+\sin \theta}{\cos \theta}, \frac{1-\sin \theta}{\cos \theta}$$

and $\tan \theta$, the multipliers in Equations 3, 5 and the counterpart expression for negative pitch angles versus pitch angles varying from zero to plus and minus ninety degrees. It will be seen that the tangent function approaches positive infinity as the value of the angle approaches positive and negative 90 degrees. Actually the plot of $\tan \theta$ during negative pitch angles should be in the third quadrant however, it is more meaningful to the present invention to illustrate its magnitude in the second quadrant inasmuch as the purpose of the present invention is to avoid large signals tending to saturate prior art analog computer components. The plots of the functions $$\frac{1-\sin \theta}{\cos \theta}$$

and $$\frac{1+\sin \theta}{\cos \theta}$$

as shown in Fig. 2 are built into potentiometers R-106 and R-107. It will be seen that although the value of the $$\frac{1-\sin \theta}{\cos \theta}$$

function may have large values outside of the 0 to +90 degrees range, that within this range the value of the function lies between zero and unity. Further, while the value of the $$\frac{1+\sin \theta}{\cos \theta}$$

function may approach large values outside of the 0 to —90 degrees range, within such range it lies between zero and unity. As will be recalled from the above description, simulated bank angle is computed using the $$\frac{1-\sin \theta}{\cos \theta}$$

function only during simulated pitch angles greater than +30 degrees, and between +30 degrees and +90 degrees, the value of this function changes from .577 to zero, in a fairly linear manner. The $$\frac{1+\sin \theta}{\cos \theta}$$

function varies similarly over a range of operation between —30 degrees and —90 degrees. Since neither of these functions approaches infinity or other large values over their intended ranges of operation, simulated flight quantities computed using these functions do not become uncorrelated, assuming of course, that the other operations made in performing such computations are properly made. For example, during the operation of the simulator at pitch angles of greater than plus or minus thirty degrees the analog computing circuitry disclosed as computing either $(\psi-\phi)$ or $(\psi+\phi)$ is not subject to errors resulting from an abortive attempt to generate infinity terms. Further, since a bank angle $\phi$ is calculated from this relationship there is always proper correlation between azimuth angle $\psi$ and bank angle $\phi$ even though the generation of azimuth angle $\psi$ might itself be subject to some error due to terms becoming large in magnitude.

The quantity $[q \sin \phi + r \cos \phi]$ multiplied by the $$\frac{1-\sin \theta}{\cos \theta}$$

function to operate the auxiliary servo is derived by means of resolvers R-202 and R-203 shown in Fig. 1 as driven by bank angle servo M-300 and summing amplifier U-109. Potentials commensurate with simulated pitching rate $q$ and simulated rate of turn $r$ derived elsewhere in conventional manner are shown connected to excite resolvers R-202 and R-203. Such potentials may be computed, for example, in the manner shown in application Serial Number 477,741, filed December 27, 1954 by Laurence E. Fogarty for "Aircraft Trainer Apparatus," now Pat. No. 2,925,667, granted February 23, 1960, which application is assigned to the same assignee as the present invention. As shown in Fig. 1, the $[q \sin \phi + r \cos \phi]$ potential is applied via summing amplifiers U-104 and U-105 to the input circuit of heading servo M-200, and also via contacts of relay K-1 or relay K-2 to excite potentiometer R-106 or R-107 if simulated pitch angle departs from zero degrees by more than the selected amount, 30 degrees. The simulated rate $p$ potential supplied at terminal 112 also may be computed as shown in the Fogarty application or by conventional means.

Since certain changes may be made in carrying out the teaching of this application without departing from the scope of this invention, it is intended that all matter contained in the above description or shown in the accompanying drawings shall be interpreted as illustrative and not in a limiting sense. For example, while direct current computation has been used in the above disclosed embodiment, it is obvious that the invention can be practiced using A.C. computation techniques using components adapted for that purpose. Further, mechanical differentials or other types of electrical self synchronous devices may be substituted for synchros T-1, T-2 and T-3. Also shaped potentiometers, such as R-106 and R-107, for deriving voltages commensurate with $$\frac{1+\sin \theta}{\cos \theta}$$

may be padded or excited non-linearly from tapped voltage dividers. If linear potentiometers are used, the functions may be generated by a non-linear motion converting mechanism driven by a shaft representing the independent variable. Moreover, while many of the summing devices have been shown herein as comprising parallel-adding feedback amplifiers they may be replaced by a variety of equivalent summing devices, such as, series summing means.

As already pointed out above, the switching of the disclosed embodiment between modes of operation represented by tangent $\theta$ and $$\frac{1+\sin\theta}{\cos\theta}$$

need not take place exactly at $\pm 30°$ of pitch angle $\theta$. Moreover, Fig. 2 indicates that infinite quantities may well be avoided by operating according to the mode characterized by $$\frac{1+\sin\theta}{\cos\theta}$$

through the entire range of plus and minus simulated pitch angle. However, it should be pointed out that the accuracy of computation of this mode in the range of small pitch angles is considerably less than that provided by the mode characterized by the computation of the $\tan\theta$.

Another possible modification of the disclosed embodiment within the teachings of the present invention would be to continue to generate bank angle $\phi$ during large pitch angles but during these periods compute the simulated azimuth angle from a quantity commensurate with either the sum or difference of azimuth and bank angle computed in the same manner as set forth above. Thus the range and modes of determination of bank and azimuth angle are effectively interchanged.

Having described my invention, what I claim as new and desire to secure by Letters Patent is:

1. In grounded flight trainer apparatus including first and second servomechanisms for providing output shaft positions commensurate with simulated pitch angle and simulated azimuth angle of a simulated aircraft, means for providing a simulated bank angle quantity properly correlated according to the laws of trigonometry applicable to angular rates and angles about a trio of non-orthogonal axes representing bank angle, pitch angle and azimuth angle, with simulated azimuth angle throughout all excursions of simulated pitch angle, comprising in combination, a simulated bank angle servo controlled by switching means to operate selectively as an integrating servo or as a position servo, an auxiliary servo controlled by said switching means to operate selectively as an integrating servo or as a position servo, means for deriving a first potential commensurate with rate of change of simulated bank angle, means for deriving a second potential commensurate with rate of change of a combination of said simulated bank angle and said simulated azimuth angle, means responsive to said azimuth, bank angle and auxiliary servos for deriving a third potential commensurate with at least said combination of bank angle and azimuth angle; said switching means being operated by said pitch angle servo to apply said first potential and said third potential to said bank angle servo and said auxiliary servo, respectively, to connect said bank angle servo as an integrating servo and to connect said auxiliary servo as a position servo during a first range of simulated pitch angles; and, said switching means being operated by said pitch angle servo to apply said third potential and said second potential to said bank angle servo and said auxiliary servo, respectively, to connect said bank angle servo as a position servo and to connect said auxiliary servo as an integrating servo during a second range of simulated pitch angles.

2. In grounded aircraft simulator apparatus for computing the simulated Euler angle orientation of a simulated aircraft which includes first and second servomechanisms for providing output shaft positions commensurate with the first and second of two simulated Euler angles, means for providing a third simulated Euler angle quantity which is properly correlated according to the laws of trigonometry applicable to angular rates and angles about a trio of non-orthogonal axes representing bank angle, pitch angle and azimuth angle, with one of said two simulated Euler angles throughout all excursions of the other of said two simulated Euler angles, comprising in combination, a third Euler angle servo and an auxiliary servo each switchably controlled by switching means to operate either as a position servo or an integrating device, means for deriving a first potential commensurate with simulated rate of change of said third Euler angle quantity, means responsive to said first servomechanism, said third servo and said auxiliary servo for deriving a second potential commensurate with the shaft positions of said first servomechanism, said third servo and said auxiliary servo, means for deriving a third potential commensurate with rate of change of a combination of one of said two simulated Euler angles and said third Euler angle, said switching means being adapted to be operated by said second servomechanism, said switching means connecting said first potential to operate said third servo as an integrating device and connecting said second potential to operate said auxiliary servo as a position servo during a first range of values of said other of said two simulated Euler angles.

3. Apparatus according to claim 2 in which said switching means is operable to connect said third potential to operate said auxiliary servo as an integrating device and to connect said second potential to operate said third servo as a position servo during a second range of values of said other of said two simulated Euler angles.

4. In grounded flight trainer computer apparatus including first and second servomechanisms for providing output shaft positions commensurate with simulated pitch angle and simulated azimuth angle of a simulated aircraft, means for providing a simulated bank angle quantity properly correlated according to the laws of trigonometry applicable to angular rates and angles about a trio of non-orthogonal axes representing bank angle, pitch angle and azimuth angle, with simulated azimuth angle throughout all excursions of simulated pitch angle, comprising in combination, a simulated bank angle servomechanism, an auxiliary servomechanism, means operated by said azimuth, bank angle and auxiliary servomechanisms for deriving a positioning signal to position said bank angle servo or to position said auxiliary servo, means for deriving a second potential commensurate with rate of change of simulated bank angle, means for deriving a third potential commensurate with rate of change of a combination of bank angle and azimuth angle, and switching means operated by said pitch angle servomechanism to connect said bank angle servomechanism to said second potential and to control said bank angle servomechanism as an integrating servomechanism during a first range of simulated pitch angles, and to connect said auxiliary servomechanism to said third potential and to control said auxiliary servomechanism as an integrating servomechanism during a second range of simulated pitch angles.

5. Apparatus according to claim 4 in which said positioning signal is applied to said auxiliary servo during said first range of simulated pitch angles and to said bank angle servo during said second range of simulated pitch angles.

6. Apparatus according to claim 4 in which said means for deriving said positioning signal comprises a plurality of synchros positioned by said azimuth, bank angle and auxiliary servomechanisms.

7. Apparatus according to claim 4 in which said third potential is commensurate with the rate of change of the sum of bank angle and azimuth angle.

8. Apparatus according to claim 4 in which said third potential is commensurate with the rate of change of the difference between bank angle and azimuth angle.

9. Apparatus according to claim 4 in which said derived third potential is commensurate with the rate of change of the sum of bank angle and azimuth angle during excursions in one direction outside said first range of simulated pitch angle, and in which said derived third potential is commensurate with the rate of change of the difference between bank angle and azimuth angle during excursions in the other direction outside said first range of simulated pitch angle.

10. In simulator computer apparatus for computing the simulated Euler angle orientation of a simulated aircraft which includes a first servomechanism for representing a first Euler angle quantity which becomes indeterminate as a second Euler angle quantity passes through a given value, the combination of an auxiliary servomechanism, means for deriving a first potential commensurate with a function of a combination of at least said first Euler angle quantity and a third Euler angle quantity, second servo means representing said second Euler angle quantity, and switching means operated by said second servo means for causing said first potential to control said auxiliary servomechanism as said second quantity approaches said given value.

11. Apparatus according to claim 10 in which said first Euler angle quantity is bank angle, said second Euler angle quantity is pitch angle, and in which said third Euler angle quantity is azimuth angle.

References Cited in the file of this patent
UNITED STATES PATENTS

| | | |
|---|---|---|
| 2,784,501 | Stern et al. | Mar. 12, 1957 |
| 2,793,445 | Wakefield et al. | May 28, 1957 |
| 2,842,867 | Dehmel | July 15, 1958 |
| 2,852,189 | Becker et al. | Sept. 16, 1958 |

FOREIGN PATENTS

| | | |
|---|---|---|
| 482,249 | Italy | June 25, 1953 |